United States Patent [19]

Gamez

[11] Patent Number: 4,789,043

[45] Date of Patent: Dec. 6, 1988

[54] LOCKING DEVICE TO PREVENT UNAUTHORIZED USE OF AN AUTOMOTIVE VEHICLE

[76] Inventor: Victor Gamez, 1423 W. 38th Pl., Hialeah, Fla. 33012

[21] Appl. No.: 44,231

[22] Filed: Apr. 30, 1987

[51] Int. Cl.$^4$ .................. B65K 79/02; E05B 17/14
[52] U.S. Cl. ............................ 180/287; 70/247
[58] Field of Search ............ 70/252, 247, 248, 15, 70/18, 424; 192/4 A; 180/271, 287

[56] References Cited

U.S. PATENT DOCUMENTS

| | | | |
|---|---|---|---|
| 3,245,239 | 4/1966 | Zaidener | 70/211 |
| 3,635,057 | 1/1972 | Foote et al. | 70/428 |
| 3,810,369 | 5/1974 | Giovanniello | 70/247 |
| 3,990,280 | 11/1976 | Jahn | 70/247 |
| 4,096,930 | 6/1978 | Viscardi | 180/287 |
| 4,317,346 | 3/1982 | Gutman | 70/424 |
| 4,658,613 | 4/1987 | Solon | 70/247 |

FOREIGN PATENT DOCUMENTS 964690 3/1975 Canada ..................... 180/287

Primary Examiner—Richard A. Bertsch
Attorney, Agent, or Firm—John Cyril Malloy

[57] ABSTRACT

A device to prevent the unauthorized use of a motor vehicle through restriction or blocking of movement of the gear shift lever, mounted on the steering column, into an operative forward or reverse gear unless the ignition lock is physically moved from an ignition off position to an ignition on position. The device engages and therefore interacts with both the ignition lock and the gear shift lever to assume the blocking position relative to movement of the gear shift lever until the aforementioned lock is physically turned to the ignition on position.

12 Claims, 1 Drawing Sheet

LOCKING DEVICE TO PREVENT UNAUTHORIZED USE OF AN AUTOMOTIVE VEHICLE

BACKGROUND OF THE INVENTION

1. Field of the Invention

This invention relates to a device mounted on the steering column of an automobile vehicle in interaction with both the ignition lock and the gear shift lever to prevent unauthorized use or operation of the motor vehicle through the blocking of movement of the gear shift lever into an operative gear position such that the automobile cannot be operated without use of a key turning the ignition lock to the ignition on position.

2. Description of the Prior Art

Anti-theft device for automobiles and like motor vehicles are well known in the prior art. Such devices include alarm systems which will sound an audible alarm if unauthorized entry of the vehicle is attempted. Other more complicated devices are electronically or otherwise connected to the ignition system, fuel line, storage battery, etc. These more complicated systems generally serve to render the motor or different systems of the vehicle inoperative such that an unauthorized person cannot physically drive the vehicle any significant distances if such vehicle is attempted to be stolen.

In an effort to overcome the sophistication or complexity of some of the systems of the type set forth above, while still providing protection, specific locks have been designed to be incorporated in an automobile and attached to various components thereof in a supplementary fashion. All of the devices set forth herein are generally designed to render the automobile inoperative from the standpoint of preventing an unauthorized person to drive or operate the vehicle.

A typical anti-theft system or assembly of the type set forth above is disclosed in the U.S. patent to Viscardi, U.S. Pat. No. 4,096,930 directed to an interlock system for interacting the gear shift and the brake system of the automobile. This system, as is typical in prior art devices, selectively prevents inadvertent movement of a motor vehicle gear shift mechanism between a non-drive "park" or "neutral" position and a "drive" position. This system includes a hydraulically or mechanically actuated interlock pin mechanism movable between a position in the path of the gear shift mechanism and a removed position out of the path of the gear shift mechanism when the motor vehicle brake is actuated.

The following U.S. patents are further representative of anti-theft devices and systems of the type generally set forth above: Quimet, U.S. Pat. No. 3,021;,913; Haefner, U.S. Pat. No. 3,669,210; Chamberlain, U.S. Pat. No. 4,033,158; Thomas, U.S. Pat. No. 4,175,635; Jessup, U.S. Pat. No. 4,270,624; Sandrock, U.S. Pat. No. 4,282,769; and Brown, U.S. Pat. No. 4,627,514.

In light of the devices of the type set forth above existing in the prior art there is still a need for a simple inexpensive easily mountable and operable anti-theft device which will prevent the unauthorized use or operation of a motor vehicle and which can be installed or removed in a minimum amount of time with a minimum amount of effort and skill on the part of the operator of the vehicle.

SUMMARY OF THE INVENTION

The present invention relates to a locking device used as an anti-theft assembly and specifically designed to be removably mounted on the steering column of an automobile or like motorized vehicle. The subject device includes an elongated body having a retaining portion located adjacent one end of the body and dimensioned and configured to removably engage the ignition lock in a somewhat surrounding relation thereon. A lever engaging portion is adjustably mounted on the body in spaced relation to the retaining portion engaging the ignition lock. The lever engaging portion is specifically disposed and configured to engage, in a somewhat blocking fashion, the gear shift lever also mounted on the steering column. The disposition of the lever engaging portion is such as to restrict its movement into an operative gear or position from a "park" or "neutral" position.

Accordingly, when the body of the locking device is disposed in interconnecting relation between the ignition lock and the gear shift lever as it extends along a length of the steering column, selective movement of the gear shift lever into a forward or reverse gear is prevented unless the ignition lock is first positioned into a "ignition on" position. Movement of the ignition lock to the ignition on position is accomplished by using an ordinary and intended ignition key. It should be apparent therefore that starting of the engine of a motor vehicle by any unauthorized means commonly known as "hot wiring" without use of the authorized key will still not serve to allow an unauthorized person to operate or drive the vehicle. Selective positioning of the gear shift lever into one of the operative positions will still be restricted until the ignition lock is moved to the aforementioned ignition on position.

Components of the body of the subject locking device include the retaining portion disposed in somewhat of a surrounding position relative to the ignition lock. The retaining position is specifically dimensioned and configured to cooperate with the finger tab on the ignition lock which are conventionally engaged by the fingers in order to rotate the ignition lock relative to the steering column on which it is mounted. When in the conventional "ignition off" position the finger tabs are disposed in interruptive position and/or engagement with part of the retaining portion thereby preventing its unauthorized removal from its gear shift lever blocking position. To the contrary, when the intended ignition key is used to rotate the ignition lock to the aforementioned ignition on position, the dimension and configuration of the retaining portion allows passage of the finger tabs associated with the ignition lock through passage means associated with the retaining portion. The subject locking device can therefore be readily removed from its gear shift blocking position on the steering column and allow conventional operation of the motor vehicle and selective positioning of the gear shift lever in the normal fashion.

The invention accordingly comprises the features of construction, a combination of elements, an arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which:

FIG. 1 is a perspective view in partial cut-away of the locking device of the present invention shown in its operable state mounted on a steering column of a motorized vehicle such as an automobile or the like.

Like reference numerals refer to like parts throughout the several views of the drawings.

DETAILED DESCRIPTION OF THE PREFERRED EMBODIMENT

Figure 1:
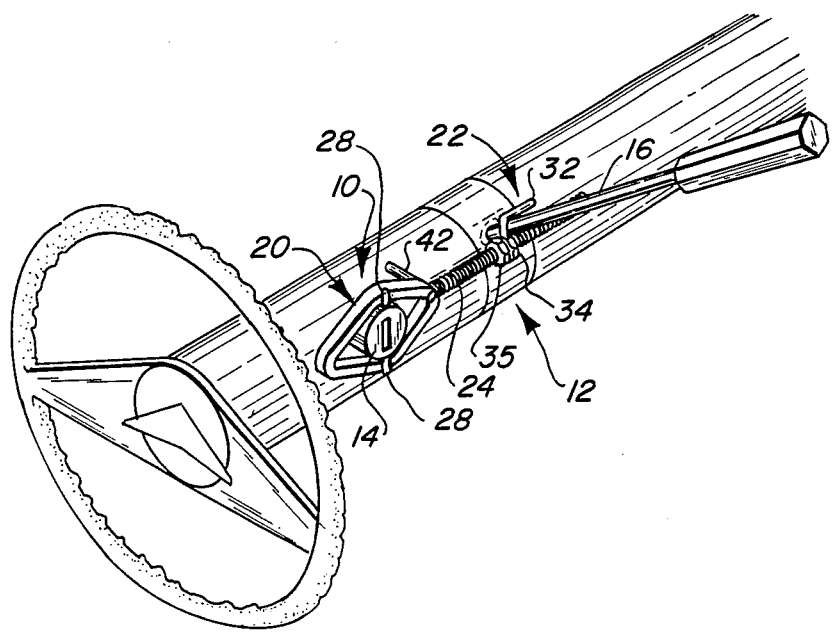
Figure 3:
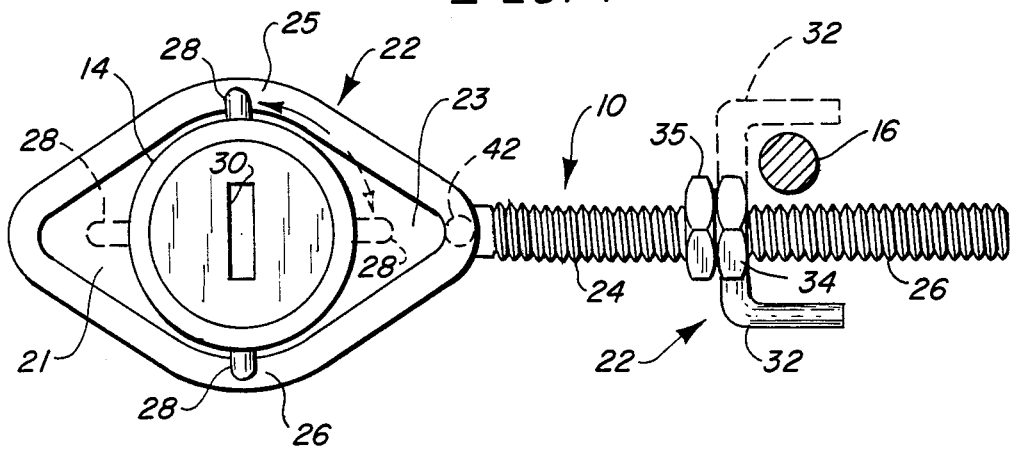
FIG. 3 is a side view in detail wherein a lever engaging portion of the subject device is represented in blocking engagement to movement of the gear shift lever, the latter position being represented in phantom lines.
Figure 2:
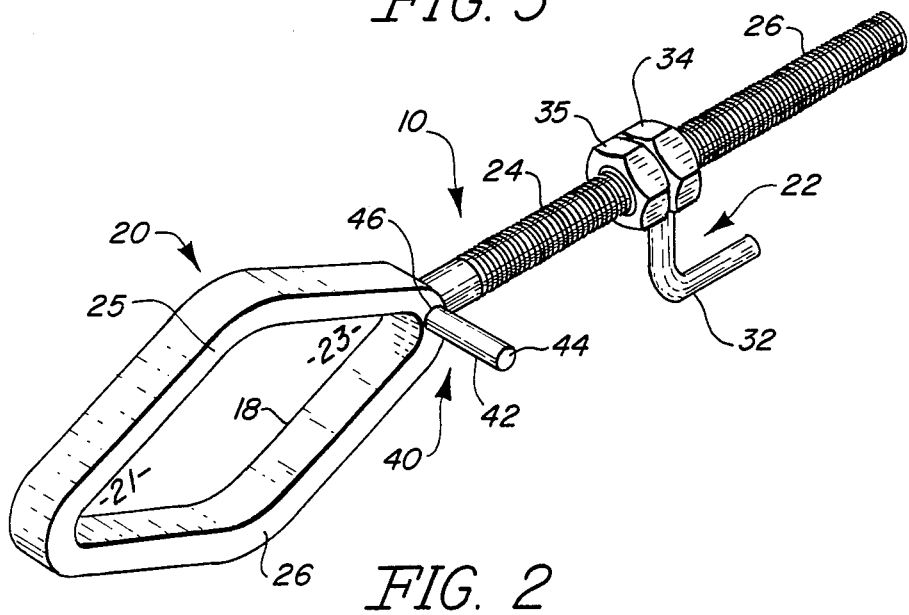
FIG. 2 is a perspective view in detail of the device of the present invention.

As shown in FIGS. 1 through 3 the locking device of the present invention is generally indicated as 10 and is designed to be mounted, in its operative locking position on a steering column 12 of a motorized vehicle such as an automobile. An ignition lock 14 is of conventional design and operation and is also mounted on the steering column 12 as is a hand operated gear shift lever 16.

The locking device 10 includes an elongated body comprising a retaining portion generally indicated as 20 and a lever engaging portion generally indicated as 22. The body itself comprises an elongated shaft 24 being externally threaded as at 26 along at least a portion of shaft 24.

The retaining portion 14 is fixedly secured along the length of the body of the device 10 and generally at one end thereof as clearly shown in FIGS. 1 through 3. The retaining portion 14 has an apertured configuration defined primarily by central opening or aperture 18. As is clearly shown the peripheral configuration of the central opening 18 is somewhat elongated so as to define enlarged opposite ends 21 and 23. The aperture 18 further includes a narrowed portion as at 25 and 26 specifically dimensioned so as to fit effectively behind and be interruptively retained on the ignition lock 14 by the positioning of the spaced apart oppositely disposed finger tabs 28 associated with the conventional design of most ignition locks 14. Typically the finger tabs 28 are to facilitate grasping of the lock by the fingers once the ignition key is properly placed within the ignition aperture 30 of ignition lock 14. Once so positioned the fingers, through grasping of the finger tabs 28 force rotation of the ignition lock 14 into the "ignition on" position indicated by the finger tabs 28 being represented in phantom lines in FIG. 3. In such ignition on position it is readily apparent that the finger tabs 28 are aligned with passage means or passages defined by the enlarged opposite ends 21 and 23 of the central opening or aperture 18. Accordingly, when in the ignition on position the retaining portion 20 can readily be removed from its normally retained and surrounding position relative to the ignition lock 14. This in turn removes the lever engaging portion 22 from a blocking position of the gear shift lever 16.

As shown in FIG. 1 however when the ignition lock 14 is in its "ignition off" position the finger tabs 28 are in retaining position relative to the retaining portion 20 as they engage the narrowed peripheral boundaries of the central opening 18 best shown in FIGS. 2 and 3. Once locked in position on steering column 12, the lever engaging portion 22 is positioned along the length of the shaft 24 so as to engage and be positioned in interruptive relation with the gear shift lever 16 thereby restricting its movement into any operative gear such as any forward or reverse gears. Many vehicles can only be "started" when the gear shift lever 16 is in a "park" or "neutral" position. However, the vehicle using this invention is rendered inoperative even if an unauthorized person were to effectively "start" the engine without turning the ignition lock 14 to the ignition on position since the shift lever 16 could not be positioned into any "operative" gear such as forward, drive or reverse.

The lever retaining portion 22 comprises an L-shaped of other appropriately configured finger or element 32 fixedly secured to a connector element which defines part of a connector means. The connector element 34 is internally threaded (not shown for purposes of clarity) so as to be adjustable along the length of the threaded exterior surface 26 of the shaft 24. Such adjustable positioning enables the lever engaging finger or element 32 to be positioned in the orientation clearly shown in FIG. 1 in solid lines and FIG. 3 in phantom lines. Such a "blocking position" restricts movement of the gear shift leverage 16 as set forth above. A locking means is associated with the lever engaging portion 22 and including a lock nut 35 also being internally threaded and positionable into snug, abutting engagement with one end or surface of the connector element 34 fixedly secured to the depending finger or element 32 of the lever engaging portion 22. It should be apparent therefore that once properly positioned, the connector element 34 along with the fixed lever engaging element 32 is maintained in its blocking position relative to the movement of the gear shift lever 16.

Another important feature of the present invention is the provision of a stabilizing means secured to the body and generally represented in FIG. 2 as 40. Such stabilizing means comprises an outwardly extending preferably linear and rigid material member 42 having one end free as at 44 and the opposite end fixedly secured preferably to an inner surface of the retaining portion as shown in FIG. 2. In operation, the blocking position of the device 10 of the present invention is clearly represented in FIG. 1. In such blocking position the stabilizing means 40 and stabilizing element 42 is disposed to extend from the retaining portion 20 of the device 10 inwardly towards the steering column as shown in FIG. 1. In such orientation the distal or free end 44 of the stabilizing element 42 actually engages the outer surface of the steering column 12 thereby restricting rotational movement and reducing the possibility of an unauthorized person prying or "twisting" the device 10 from its retained and gear shift blocking position as is clearly shown in FIG. 1.

Now that the invention has been described,
What is claimed is:

1. A locking device designed to restrict unauthorized use of an automobile or like vehicle when used with an ignition lock and a gear shift lever both mounted on the steering column of the vehicle, said device comprising:
    (a) a body having an elongated configuration and formed of a substantially rigid, high strength material,
    (b) said body being of sufficient longitudinal dimension to extend at least from the ignition lock, along a length of the steering column, to the gear shift lever,
    (c) a retaining portion formed along the length of said body and disposed in engaging relation to the ignition lock and being dimensioned and configured to be undetachable from the ignition lock when in an ignition off position and detachable therefrom when in an ignition on position, (d) a lever engaging portion mounted on said body in spaced relation to the retaining portion and in removable engagement with the gear shift lever and comprising a stop member positionable in abutting, interruptive disposition relative to displacement of the gear shift lever towards the ignition lock, (e) connecting means attached to said stop member and movable therewith along the length of said body for selectively adjusting the position of said stop element relative to and between the gear shift lever and the retaining portion, (f) a stabilizing means for restricting twisting movement of the body and comprising a finger extending outwardly from an inner surface of said retaining portion and in transverse relation to the length of said body and being of sufficient longitudinal dimension to engage the steering column, (g) said finger disposed adjacent the ignition lock and between the ignition lock and said lever engaging portion and including a free end disposed in engagable relation to the steering column, and (h) whereby the gear shift lever is restricted from being positioned into an operative gear when said body engages both the ignition lock and the gear shift lever.

2. A device as in claim 1 wherein said retaining portion comprises a substantially apertured construction including a central opening of sufficient dimension to receive the ignition lock therein, said retaining portion removably disposable and substantially surrounding relation to the ignition lock and in engagement with finger tabs of the ignition lock when in the ignition off position.

3. A device as in claim 2 wherein said retaining portion further comprises passage means disposed and dimensioned for passage therethrough of the finger tabs when the ignition lock is in the ignition off position.

4. A device as in claim 3 wherein said passage means is defined by enlarged end portions of said central opening, said end portions being diposed on opposite sides of the ignition lock and in alignment with the finger tabs when the ignition lock is in the ignition on position, said enlarged end portion being of sufficient dimension to allow passages therethrough of the finger tab, whereby the retaining portion may be removed from the ignition lock when in the ignition on position.

5. A device as in claim 1 wherein said body comprises an elongated shaft extending from said retaining portion along the length of said steering column towards the gear shaft lever, said connecting means comprising a connector element secured to said lever engaging portion and adjustably positionable along the length of said shaft.

6. A device as in claim 5 wherein said shaft comprises an externally threaded surface along a portion of the length thereof, said connector element being internally threaded and movably engaged said shaft along said exterior threaded surface thereof.

7. A device as in claim 6 wherein said lever engaging portion is fixed to said connector element and rotatable therewith about said shaft.

8. A device as in claim 7 wherein said connector means further comprises a locking means engagable along said connector element for securement thereof relative to said shaft.

9. A locking device designed to restrict unauthorized use of an automobile or like vehicle when used with an ignition lock and a gear shift lever both mounted on the steering column of the vehicle, said device comprising:

(a) a body having an elongated configuration and formed of a substantially rigid, high strength material, (b) said body being of sufficient longitudinal dimension to extend at least from the ignition lock, along a length of the steering column, to the gear shift lever, (c) a retaining portion formed along the length of said body and disposed in engaging relation to the ignition lock and being dimensioned and configured to be undetachable from the ignition lock when in an ignition off position and detachable therefrom when in an ignition on position, (d) said retaining portion comprising an apertured construction having a central opening defining a passage means disposed and dimensioned for passage therethrough of finger tabs of the ignition lock when the ignition lock is in the ignition on position, said passage means defined by enlarged end portions of said central opening, said end portions being disposed on opposite sides of the ignition lock and in alignment with the finger tabs when the ignition lock is in the ignition on position, said enlarged end portion being of sufficient dimension to allow passage therethrough of the finger tabs, whereby the retaining portion may be removed from the ignition lock when in the ignition on position, (e) said central opening further configured for surrounding relation to the ignition lock and being transversely dimensioned for engagement with the finger tabs of the ignition lock when in the ignition off position, (f) a lever engaging portion mounted on said body in spaced relation to the retaining portion and in removable engagement with the gear shift lever and comprising a stop member positionable in abutting, interruptive disposition relative to displacement of the gear shift lever towards the ignition lock, (g) connecting means attached to said lever engaging portion and movable therewith along the length of said body for selectively adjusting the position of said lever engaging portion relative to and between the gear shift lever and the retaining portion, (h) whereby the gear shift lever is restricted from being positioned into an operative gear when said body engages both the ignition lock and the gear shift lever.

10. A device as in claim 9 further comprising a stabilizing means secured to said retaining portion and extending outwardly therefrom into engagement with the steering column for restricting twisting movement of the body and removable from the ignition lock when in the ignition off position.

11. A device as in claim 10 wherein said stabilizing means comprises a finger extending outwardly from said retaining portion in transverse relation to the length of said body and being of sufficient longitudinal dimension to engage the steering column.

12. A device as in claim 11 wherein said finger comprises a substantially linear configuration and is disposed adjacent the ignition lock and between the ignition lock and said lever engaging portion.

* * * * *